Dec. 22, 1964 C. P. DE BIASI Re. 25,702

HYDRAULIC SYSTEM AND APPARATUS FOR [DUMP TRUCKS] VEHICLES

Original Filed Jan. 13, 1960 6 Sheets-Sheet 1

INVENTOR

CHARLES P. deBIASI

BY Robert Neal Roley

ATTORNEY

HYDRAULIC SYSTEM AND APPARATUS FOR [DUMP TRUCKS] VEHICLES

Original Filed Jan. 13, 1960 6 Sheets-Sheet 2

INVENTOR
CHARLES P. deBIASI
BY Robert Ned Foley
ATTORNEY

HYDRAULIC SYSTEM AND APPARATUS FOR [DUMP TRUCKS] VEHICLES

Original Filed Jan. 13, 1960 6 Sheets-Sheet 3

INVENTOR
CHARLES P. deBIASI
BY
ATTORNEY

HYDRAULIC SYSTEM AND APPARATUS FOR [DUMP TRUCKS] VEHICLES

Original Filed Jan. 13, 1960 6 Sheets-Sheet 4

INVENTOR
CHARLES P. deBIASI
BY Robert Neal Roley
ATTORNEY

HYDRAULIC SYSTEM AND APPARATUS FOR [DUMP TRUCKS] VEHICLES

Original Filed Jan. 13, 1960 6 Sheets-Sheet 5

INVENTOR
CHARLES P. deBIASI

BY Robert Neal Kolev
ATTORNEY

HYDRAULIC SYSTEM AND APPARATUS FOR [DUMP TRUCKS] VEHICLES

Original Filed Jan. 13, 1960 6 Sheets-Sheet 6

INVENTOR

CHARLES P. deBIASI

BY Robert Neal Roby

ATTORNEY

United States Patent Office

Re. 25,702
Reissued Dec. 22, 1964

25,702

HYDRAULIC SYSTEM *AND APPARATUS* FOR [DUMP TRUCKS] *VEHICLES*

Charles P. de Biasi, 74 Braman Road, Waterford, Conn.

Original No. 3,003,262, dated Oct. 10, 1961, Ser. No. 2,240, Jan. 13, 1960. Application for reissue Apr. 6, 1962, Ser. No. 186,603
15 Claims. (Cl. 37—41)

Matter enclosed in heavy brackets [ ] appears in the original patent but forms no part of this reissue specification; matter printed in italics indicates the additions made by reissue.

The present invention generally relates to novel *hydraulic systems and* structural arrangements and orientations in the control mechanism and drive mechanism for [a dump truck type of] vehicles and more particularly to novel orientations and arrangements in [the] hydraulic and electric systems *and apparatus* for [powering and] controlling [all of the attachments] *and driving vehicles as well as powering any hydraulically operable unit, attachment, accessory, apparatus, arrangement, functions, elements, devices, or the like,* that may be employed [on a dump truck] *therewith.* [Dump trucks] *draulic systems and* structural arrangements and orien-

*For example, dump trucks may be used for* other *functions* than carrying loads such as has been disclosed in copending applications Serial Nos. 815,970 *now Patent No. 3,072,290* and 830,609 *now Patent No. 3,050,203* in which spreader assemblies are [disclosed and also] *shown, described and illustrated together* with a feeding device for the *respective* spreader assembly [and] *with* an automatic control mehcanism [is] *being provided therefor.*

Further, *vehicles such as* dump trucks may be provided with hydraulically controlled snow plows mounted on the front thereof and also, [the] *a* load carrying body [is] *may be* provided with a hydraulically powered hoist. The present day practice in [dump trucks] *vehicles* of this nature is to provide a power take-off in the drive train or transmission for driving a hydraulic pump or pumps for controlling the position of the various driven elements. This requires considerable effort in repair [of the unit] and also when refilling the hydraulic system. [Therefore, it is one]

*It is also to be understood that other types of vehicles may be provided with still other hydraulically operable units, attachments, accessories, apparatus, arrangements, functions, elements, devices, or the like, for performing various purposes and functions other than those as stated above.*

*Accordingly, it is a principal object of this invention to provide a vehicle with an improved hydraulic system, apparatus and method for controlling and driving the vehicle as well as powering any hydraulically operable unit, attachment, accessory, apparatus, arrangement, function, element, device, or the like, which may be employed or associated with the vehicle.*

*An additional object of this invention is to provide an improved hydraulic system, apparatus and method for controlling and driving a vehicle as well as powering any hydraulically operable unit which may be employed or associated therewith wherein the system, apparatus and method comprises a source of hydraulic pressure or supply means which is responsive to the demand placed thereon by the hydraulically operable unit which is operated thereby, and means or structure for controlling the hydraulic pressure supply means.*

*It is also an additional object of this invention to provide an improved hydraulic system, apparatus and method for controlling and driving a vehicle as well as powering any hydraulically operable unit which may be employed or associated with the vehicle wherein the method, apparatus and system comprises a single variable discharge pump that is responsive to the demand of the unit which is operated thereby together with means or structure for controlling the discharge of the pump.*

*Another* object of the present invention *is* to provide a hydraulic system, *apparatus and method for driving a vehicle as well as powering any hydraulically operable unit which may be associated therewith,* in which a single pump is located under the *vehicle* hood and is driven by [a] suitable *means which may be in the form of a* belt or the like from a crankshaft pulley which enables easy repair of the pump and refilling of the *hydraulic* system, the pump being of a type having a variable discharge that is variable in response to the demand of the *hydraulically operable* units being supplied by the pump.

[Another object of the present invention is to provide a hydraulic system including a control panel in the cab of the truck located at a convenient place such as on the dashboard which panel would have controls for the dump body hoist, snow plow, spreaders and feeders.]

[A further important object of the present invention is to provide a dump body hoist that is fixed to the truck frame and the body whereby the body can be powered both upwardly and downwardly.]

[Another feature of the present invention is to provide a hydraulic and electric system for dump trucks which is simple in operation, easy to use, effective for its particular purposes and is generally inexpensive in its layout and installation.]

[These together with other objects and advantages which will become subsequently apparent reside in the details described and claimed, reference being had to the accompanying drawings forming a part hereof, wherein like numerals refer to like parts throughout, and in which:]

*It is also a further object of this invention to provide an improved hydraulic system, apparatus and method for driving vehicles as well as powering any and all hydraulically operable units which may be associated therewith which is inexpensive to manufacture and install; economic, effective and simple in operation, and reliable and durable in use for the purpose and function as desired.*

*Other objects and important features of the invention will be apparent from a study of the specification following taken with the drawing, which together show, illustrate, disclose and describe certain embodiments and modifications of the invention and what is now considered to be several possible modes of practicing the principles thereof. Other embodiments or modifications may be suggested to those having the benefit of the teachings herein, and such embodiments or modifications are intended to be reserved especially as they fall within the scope and spirit of the subjoined claims.*

*In the drawing:*

Figure 1:
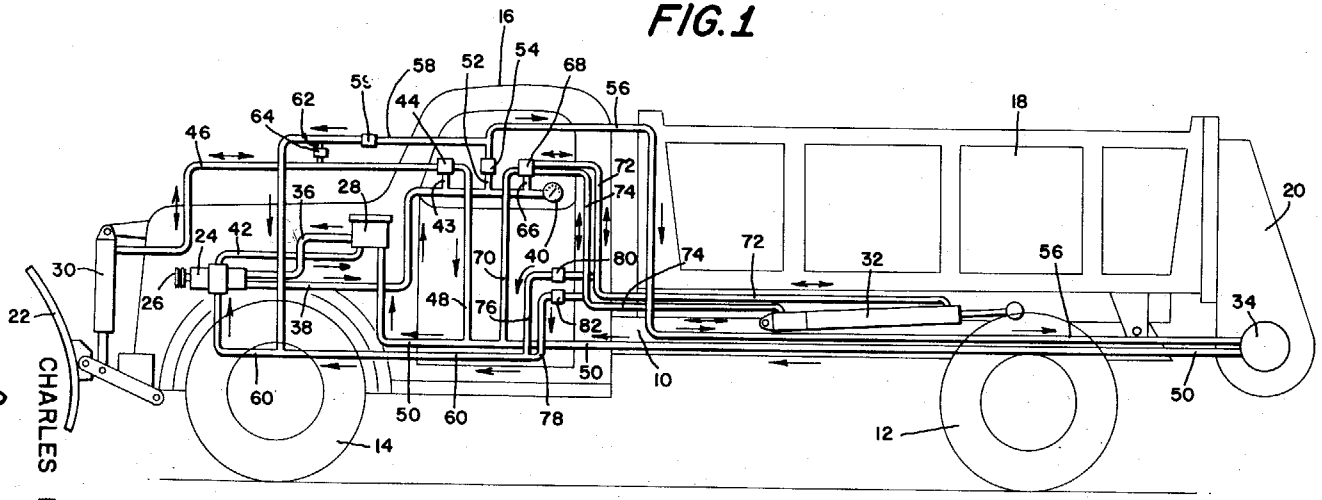
FIGURE 1 is a schemative view [the] *a* hydraulic system, *method and apparatus,* of the present invention, illustrating a *vehicle in the form of a* dump truck in side elevation and including [the] *a plurality of hydraulically operable units such as a dump truck body, a* dump truck hoist, a spreader on the rear of the dump truck body and a snow plow on the forward end of the dump truck.
Figure 2:
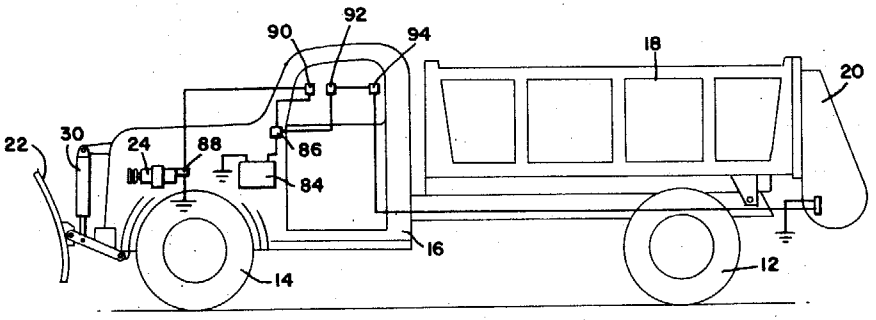
FIGURE 2 is a schematic view of [the] *an* electrical system employed in conjunction with the hydraulic system [of], *apparatus and method as shown in* FIGURE 1.

[Referring now specifically to FIGURES 1 and 2 of the drawings, the hydraulic electrical control system for the dump truck is disclosed in which the dump truck is provided with]

*Attention is now directed to FIGURES 1 and 2 of the drawing wherein a vehicle is illustrated as being provided with an improved hydraulic system and method which comprises apparatus for controlling and driving the vehicle as well as powering any hydraulically operable attachments, accessories, apparatus, arrangements, functions, elements, devices, or the like, which, for the sake of brevity, will hereinafter be described, disclosed and set forth in the claims as hydraulically operable units each of which may be for many different and distinct purposes as well as for separate and independent functions, as desired, together with means or structure for controlling the apparatus and means for actuating the apparatus.*

*By way of example, the vehicle, for the purpose of illustration only, is herein shown in the drawing and described in the descriptive portion of the specification as a truck which is provided with a plurality of hydraulically operable units, such as a dump body,* a snow plow, a hoist for the dump body and a spreader with the dump body feeding [the] material *to be spread* into the spreader with the [device] *hydraulic system, apparatus and method* being manually controlled *by an operator of the vehicle.*

The dump truck includes [the usual] frame 10, rear driving wheels 12, front wheels 14, cab 16 and *a plurality of hydraulically operable units, such as a* dump body 18 having a spreader 20 mounted on the rear thereof[ .], *and* [Supported] *supported* from the forward portion of the frame *10 there* is a snow plow 22, all of which are orientated in a manner well known with the spreader 20 being that shown in my prior pending applications, *identified above.*

[The hydraulic system includes a pump]

*In order to drive or otherwise operate the vehicle as well as power the plurality of hydraulically operable units, an improved hydrostatic or hydraulic system, apparatus and method is provided for the vehicle with the apparatus of the hydraulically operating system and method comprising a source of hydraulic pressure or supply means in the form of a single variable discharge pump device* 24 having a drive pulley 26 thereon for driving from [a] suitable *means such as a* V-belt arrangement [and] *operatively connected with the vehicle engine* with the pump device 24 being located under the *vehicle* hood [of the cab of the truck with there also being] *whereat there may also be* provided a reservoir 28 [under the hood of the truck] whereby the pump *device 24* may be repaired and the reservoir *28* refilled with hydraulic fluid whenever desired with it only being necessary to elevate the *vehicle* hood.

The position of the snow plow 22 is controlled by *means such as* a hydraulic piston and cylinder arrangement 30 and the dump body 18 is elevated by virtue of

*means such as* a hydraulic hoist 32 which is in the form of a piston and cylinder arrangement and the spreader 20 is powered by *means such as* a hydraulic *arrangement in the form of a fixed displacement* motor 34 *which may be of axial piston type* all of which are powered from the single pump *device* 24.

*It is to be understood that the hydraulic means which is herein shown, disclosed, described, illustrated and claimed, such as the hydraulic piston and cylinder arrangements and the fixed displacement motors which power, drive or in other ways operate the various hydraulically operable units are interchangeable and may, in fact, be replaced by still other types of hydraulic means.*

The hydraulic system [includes], *apparatus and method also comprises conduit and valving means such as* an inlet line 36 extending from the reservoir 28 to the pump *device* 24 and [a] *fluid presssure supply conduit means or* high pressure discharge line 38 extending from the pump *device* 24 and terminating within the cab 16 *of the vehicle* with there being a pressure gauge 40 thereon for indicating the pump pressure *of the hydraulic system.* The pump *device* 24 is also provided with a bypass line *or return conduit means* 42 extending from the pump *device* 24 to the reservoir 28.

Extending from the *fluid pressure supply conduit means or* high pressure line 38 is a branch line 43 connected with a snow plow directional control valve 44 having a *snow plow* fluid line 46 connected therewith and extending to the snow plow piston and cylinder arrangement 30. The valve 44 is also connected to a return line *or conduit means* 48 which in turn is connected with a low pressure return line 50 extending into the reservoir 28. A second branch line 52 extends from the high pressure line 38 and includes [an] *a variable* orifice control valve 54 connected with a supply line 56 extending to the hydraulic motor 34 for controlling the rotational speed of the hydraulic *arrangement or* motor 34 [and hydraulic motor 34] *which in turn* is connected with the low pressure return line 50 for return of the hydraulic fluid to the reservoir 28. A pressure control line *or control conduit means* 58 having a check valve 59 therein is provided from the *variable* orifice control valve 54 *directly* back to *structure for varying the displacement of the pump device 24 through control conduit means* or [a] pressure control [or bypass] line 60 [to the pump 24]. Also connected to this line is a cross over line 62 having a check valve 64 therein which connects the snow plow line 46 to the pressure control line *or control conduit means* 58 with the check valves 59 and 64 permitting flow in the direction from the snow plow line 46 and motor supply line 56 to the pressure control line 58.

A third [pressure] branch line 66 is connected to the high pressure line 38 and this line is provided with a hoist control valve 68 having a return line 70 connected with the low pressure return line 50 and having a pair of alternate *hoist* pressure or return lines 72 and 74 connected with the opposite ends of the hoist cylinder *of the hydraulic arrangement* 32 for selectively admitting and exhausting pressure from the opposite ends of the hoist cylinder [32] whereby the hoist cylinder *of the hydraulic arrangement* 32 will effectively be double acting.

The alternate pressure and return lines 72 and 74 also are connected to the pressure control line 60 by lines 76 and 78, respectively, each of which has a check valve 80 and 82 respectively *provided* therein which permits flow in the direction from the lines 72 and 74 to the line 60.

*The control conduit means 58, 60, 62, 76 and 78 are each connected to the respective high fluid pressure supply conduit means 52, 56, 43, 46, 66, 72 and 74 at locations therealong which are downstream relative to the respective valvings 54, 44 and 68 with such locations being also intermediate the valvings and the respective hydraulic means 32, 34 and 30 for operating the units.*

FIGURE 2 illustrates the electrical circuitry in which [the] *a* battery 84 is illustrated in the usual position as [is the] *well as an* ignition switch 86. The ignition switch 86 supplies electrical energy to [the] *a* pump solenoid 88 through a pump solenoid swtch 90. Also, electrical energy is supplied to a [single pole] *spreader* switch 92 in series with a buzzer *signal* 94 and the spreader *20* for signaling the operator of the vehicle. Both the pump solenoid switch *90* and the spreader switch *92* are of the single pole type and of the on and off [type] *variety* which are manually controlled.

The pump *device 24* employed in the present [instances] *embodiments or modifications of the invention* is a Sundstrand Hydraulic Division 32 PV series, variable displacement pump *normally having a minimum flow,* with integral fixed orifice control *means or structure.* The integral control *means or structure* measures the pump output or motor demand *through the fluid pressure which is transmitted thereto by the control conduit means 58, 60, 62, 76 and 78* and compensates itself by varying the pump wobbler angle in response to the *developed fluid* pressure in the *control conduit means 58, 60, 62, 76* and *78* [pressure bypass line 60]. Thus, the variations of the [truck] *vehicle* engine r.p.m. [does] *do* not affect the output *or discharge* of the pump *device 24.* The pump *device 24* also has [a] *the* solenoid *88 disposed* so that when no hydraulic power is desired [the], a three way switch *124, note FIGURE 7 of the drawing,* is energized to the solenoid *88* on the pump *device 24* which in turn places the pump wobbler *substantially* normal to the pump pistons. Being an axial piston pump, no oil is pumped with the wobbler in this position. The three way switch *124* is placed in series with the [truck] *vehicle* ignition switch *86* so that there will be no chance of the battery *84* being run down when the [truck] *vehicle* is not in use. The second leg of the three way switch *124* is in [a] series with the spreader and feeder electrical system*s.* The single pole switch *92* is for the purpose of disconnecting the spreader feeder system when not in use and to turn off the buzzer *94* when the [driver] *operator* is on his way for another load of material for spreading.

The double acting hydraulic hoist [hoise] *arrangement 32* for the dump body *18* will assure that the body may be lowered as well as raised since it is not unusual to see a dump truck body stuck in a raised position due to a counterbalancing weight such as a large stone that will not pass through the tailgate or because most of the material in the body is at the rear and the tailgate is stuck or jammed. This last mentioned condition is quite often aggravated when trucks are equipped with spreaders attached to the rear adding to the unbalanced weight.

Figure 3:
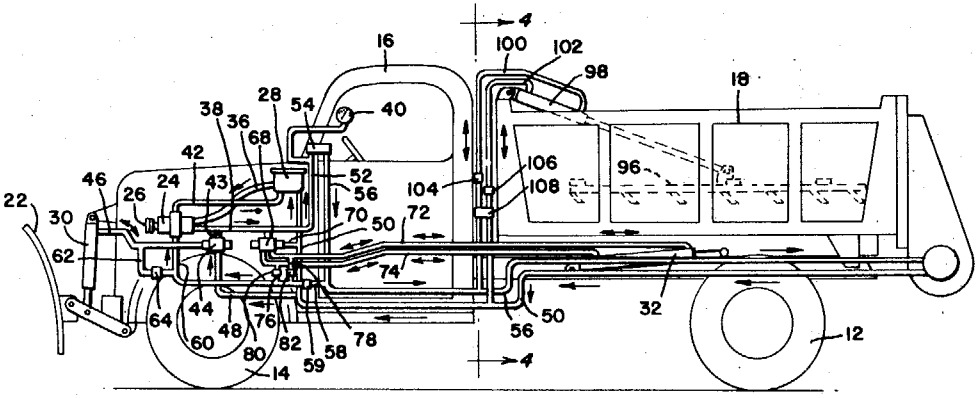
FIGURE 3 is a side elevational schematic view similar to FIGURE 1 but with the addition of a hydraulically controlled feeder for the spreader.
Figure 4:
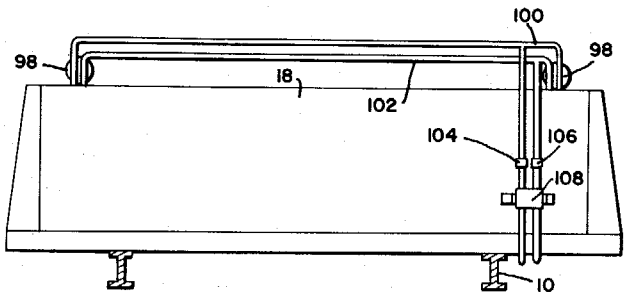
FIGURE 4 is a transverse, sectional view taken substantially upon a plane passing along section line 4—4 of FIGURE 3 illustrating the arrangement of [the] hydraulic *conduit means or* lines for [the] *hydraulic* piston[s] and cylinder[s] *arrangements* which operate the feeder.

In FIGURE 3 of the drawing[s], the arrangement of [components] *the hydraulically operable units and other components of the vehicle* is substantially the same as that employed previously and the same reference numerals are used as in FIGURE 1. In this [form] *embodiment or modification* of the invention, the dump body 18 is provided with a reciprocating feeder 96 powered by a pair of hydraulic piston and cylinder arrangements 98 of the double acting type each of which is provided with a pair of alternate pressure and return lines 100 and 102 which extend downwardly and are connected to the high pressure line [66] *56* and *the* low pressure return line [60] *50* respectively with these two lines including cross overs to the two respective piston and cylinder arrangements 98 and each being provided with a needle valve 104 and 106 respectively and also being provided with a solenoid control valve 108 for the feeder *96.* Other of the *hydraulically operable units or* components are slightly reoriented in the schematic view of FIGURE 3 but retain the same functional relationship.

Figure 5:
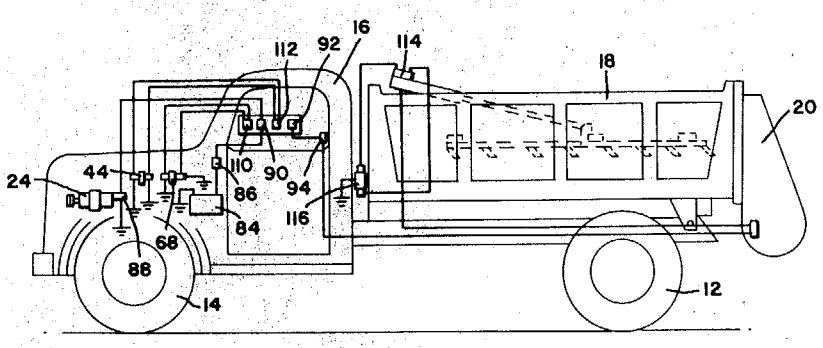
FIGURE 5 is a schematic view of the electrical system employed with the hydraulic system [of], *apparatus and method as shown in* FIGURE 3.

In the electrical circuitry illustrated in FIGURE 5, the same reference numerals for the same components are employed as in FIGURE 2 including the battery 84 and the pump solenoid [switch] 88. The ignition switch 86 supplies electrical energy to the several other switches including the spreader switch 92 and the buzzer signal 94 and also the pump solenoid switch 90. Also provided is a hoist switch 110 and a snow plow switch 112 which respectively control the snow plow valves and the hoist valves.

For automatic control, the feeder piston and cylinder arrangements *98* are each provided with limit switches 114 which control operation of the feeder switch valve 116.

Figure 6:
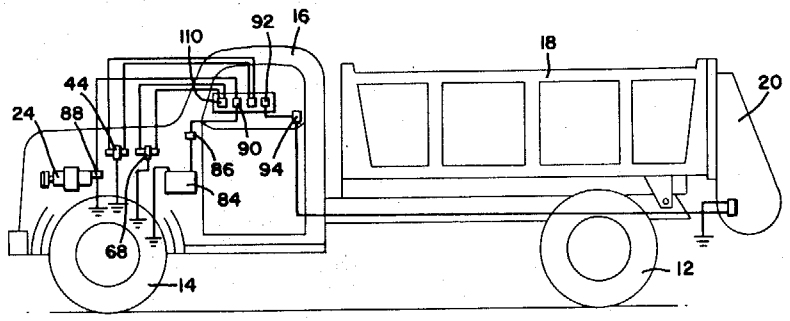
FIGURE 6 is a schematic electrical arrangement similar to FIGURE 5 but with the dump body spreader being fed by raising the dump body rather than the hydraulically operated feeder; [and]
Figure 8:
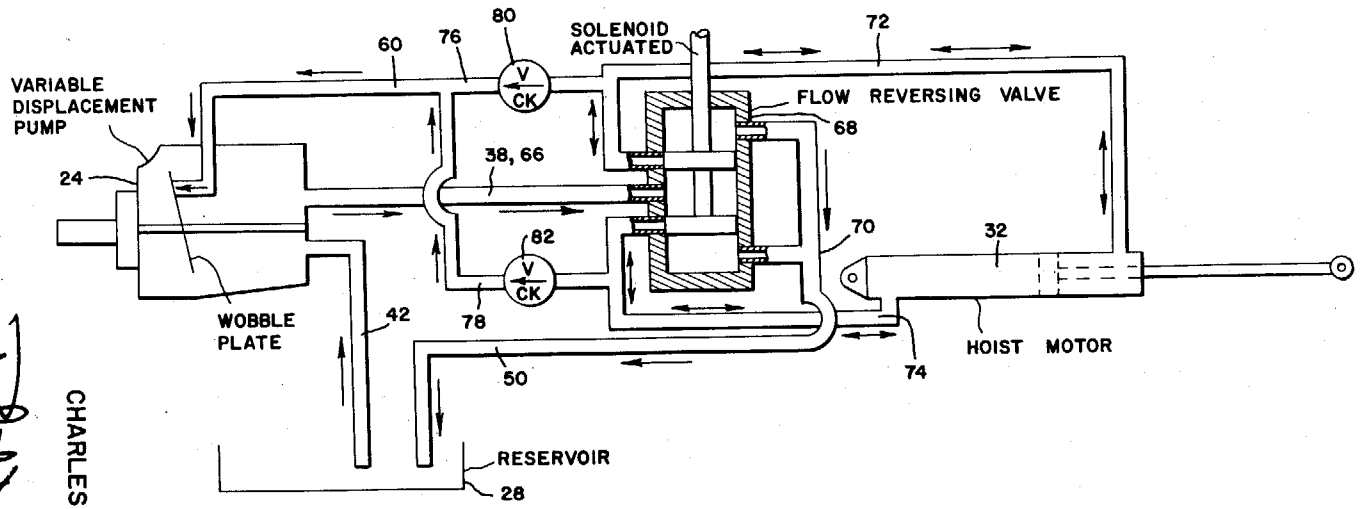
*FIGURE 8 is an enlarged schematic view of the hydraulically operable unit and system for operating the dump truck hoist;*
Figure 9:
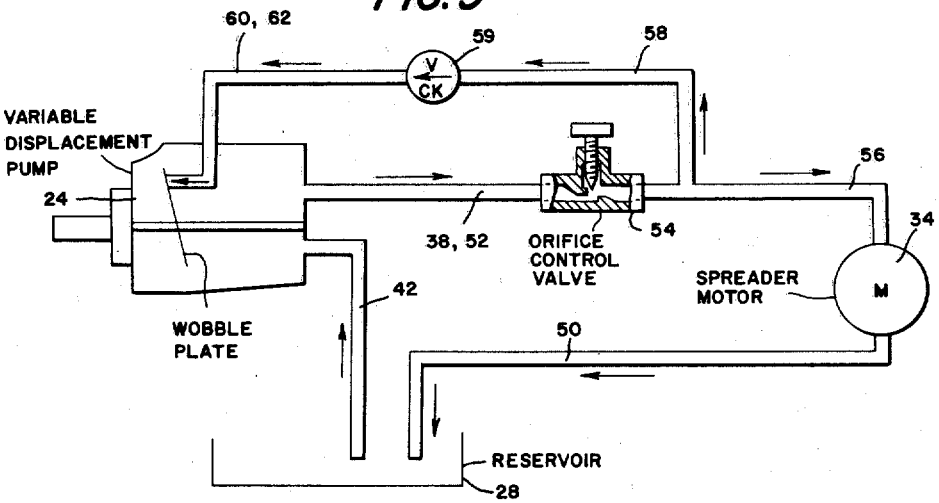
*FIGURE 9 is an enlarged schematic view of the hydraulically operable unit and system for operating the spreader, and*
Figure 10:
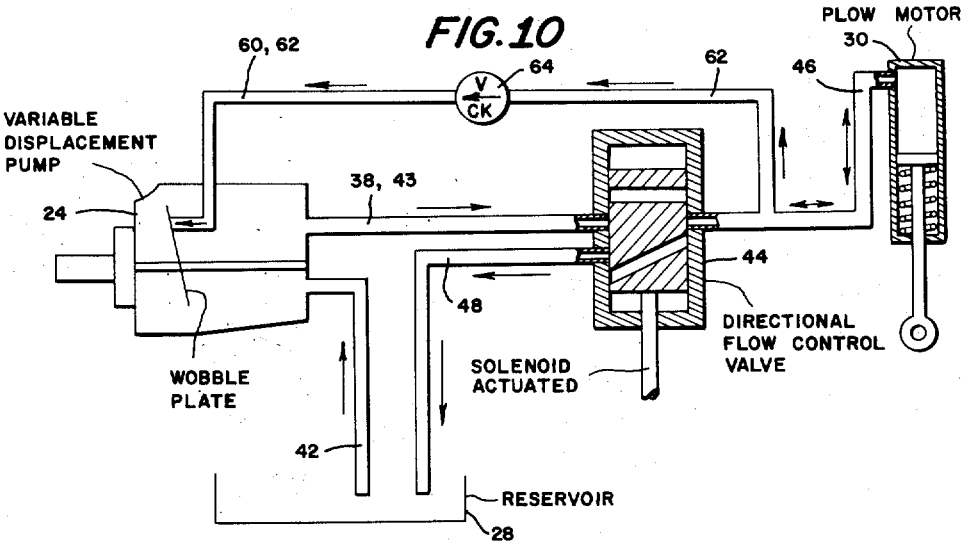
*FIGURE 10 is an enlarged schematic view of the hydraulically operable unit and system for the snow plow.*

The electrical system in FIGURE 6 is the same as that in FIGURE 5 except that the feeder assembly in the switches and hydraulic system is not employed and the material is fed to the spreader *20* by raising the dump truck body *18* in the conventional manner.

In using the system[s] *and apparatus of the embodiment as shown in FIGURE 3* of the present invention, if the [driver] *operator of the vehicle* has a load of material with the spreader *20* attached and he is ready to spread, the procedure would be as follows: He deenergizes the pump solenoid *88* by use of the three way switch *124* and simultaneously connects the electrical circuit to the spreaders and feeders. Also, the single pole switches, *such as 90 and 92,* must be *closed* [connected]. Now if the spreader [switch] demands material due to emptiness of the spreader *20,* as disclosed in my previous pending applications, *identified above,* the solenoid four way valve *108* will cause the feeder *96* to operate until the spreader switch *92* is satisfied. This operation will automatically repeat. Now the [driver] *operator* turns to the *variable* orifice control valve *54* and sets it at any number he desires by using [the] *a* control handle 118 illustrated in FIGURE 7 which has a pointer 120 thereon for association with one of a series of numerals 122 indicating the setting of the spreader *20* depending on whether he wants to spread a large or small quantity of material per mile of road. It must be borne in mind that with this system the r.p.m. of *the spreader motor 34* [all spreaders] will be constant, depending only on the setting of the *variable* orifice control valve *54.* All *of the* hydraulic motors *which may be employed to operate the respective hydraulically operable units* are [also] *of* [axial piston] *fixed displacement* types.

The buzzer *signal 94* has two functions in that it is essential when material is to be spread by dump body loading of the spreader *20,* such as by using hopper type spreaders, and when using the spreader *20* with the feeder *96* it will notify the [driver] *operator* when *the dump* body *18* is empty and the spreader switch *92* cannot be satisfied. Should the [driver] *operator* desire to plow snow but has a spreader *20* attached, he would *open* [disconnect] the single pole switch *92* so that he would not be annoyed by the buzzer *signal 94,* deenergize the pump solenoid *88 by opening the pump solenoid 90, closing the orifice control valve 54 by setting the control handle 118 at zero* and then control the snow plow *22* by means of the snow plow [orifice] *control* valve *44.* Under this condition, the spreader *20* and *the* feeder *96* would of course be out of operation. Should the [driver] *operator* desire to use the *dump* body [dump] *hydraulic* hoist *32,* he would again deenergize the pump solenoid *88, and* if no spreader *20* is attached he can forget the single pole switch *92,* and raise the *dump* body *18* by the use of the *hoist control* four way [manual] valve *68.* Should the *dump* body *18* become stuck in raised position because of previously described reasons he can power it back to a level position.

Figure 7:
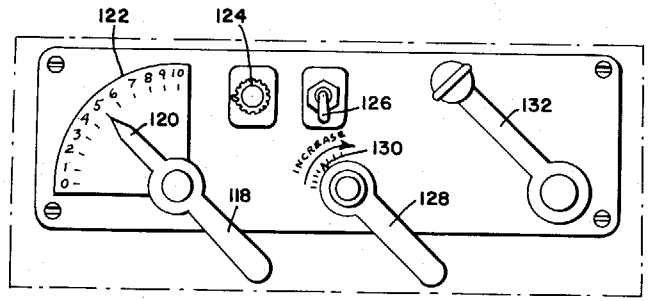
FIGURE 7 is a schematic plan view of [the] *a* control panel for the hydraulic control system[.]

FIGURE 7 illustrates the orifice control valve handle 118 for controlling the *operation of the* spreader *20* and *the* feeder *96.* Also, *FIGURE 7 of the drawing shows,* the three way switch *124* for electrical control of pump solenoid *88* and *the* spreader *20* [is designated by the numeral 124 while the] *along with a* single pole switch *126* [to disconnect] *for disconnecting* the spreader *20* when desired [is designated by the numeral 126]. [The] A directional control valve *128 is illustrated* for the snow plow *22* [is designated by the numeral 128] which is *in the form of* a handle [therefor together with] *having* a pointer 130 for [controlling] *indicating* the position thereof. The four way hydraulic control valve *68* for the [dump] *hydraulic* [hoise] *hoist 32* is provided with a handle 132 for operation thereof all of which is mounted in a control panel accessible to the [driver] *operator* of the vehicle.

While the orientation of the pump *device 24* has been disclosed for [exclusive] powering from a crankshaft takeoff or other motor, it is pointed out that the pump *device 24* could be oriented for a power takeoff from the rear end of *the vehicle,* the engine *of the vehicle,* from the flywheel or from the transmisison of the [truck] *vehicle.* The orientation of the pump *device 24* may be varied to adapt it to installation in various [trucks] *types of vehicles* having various orientations of *hydraulically operable units or* components [under the hood and adjacent areas] *associated therewith.* For example, the pump *device 24* could be located in other areas than under the hood *of the vehicle* since the pump *device 24* [will] will normally require very little servicing. Another example is the [truck] *vehicle* arrangements which have cab assemblies which pivot forwardly to provide access to the entire engine and drive train when desired. Thus, it is within the purview of the present invention to orientate the pump *device 24* in any desired location and to power the pump *device* from any suitable power takeoff from the engine or drive line for the [truck] *vehicle as well as operate a plurality of hydraulically operable units which may be associated with the vehicle.*

The pump [structure] *device 24* employed in the present *embodiments or modifications of the* invention is one presently commercially available from Sundstrand Hydraulic Division, of Rockford, Illinois. In the above mentioned pump *device,* the *bypass* line *or return conduit means* 42 is known as a drain line for the casing which drains fluid back to the reservoir. Also, all branch hydraulic circuits must have a line which feeds pressure back to the pump *device 24.* Each of these lines is provided with a check valve to prevent this pressure from effecting other circuits. *In this instance, the particular type of pump device 24, that is used is provided with bleeder means (not illustrated) which enables a controlled or regulated release of fluid pressure which may be acting on the pump control structure through the control conduit means 60, 62, 58, 76 and 78, as the case may be, and permit the pump control structure to return to the normal minimum flow adjustment.* Thus, the *control conduit means or* lines 60, 62, 58, 76 and 78 are all pressure control lines. In [this] *the* pump *device 24,* a pressure drop across [the] *a* remote line is reflected through the pressure control *structure* line back to the pump control and at a given orifice *or valve* setting, the pump *device 24* will maintain that flow regardless of the input speed of the pump *device.*

[The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.]

*While the invention has been described, disclosed, illustrated and shown in terminology and figures, respectively, of certain embodiments and modifications which it has assumed in practice, it is to be understood that the scope of the invention should not be deemed to be limited by the present embodiments and modifications which are herein described, disclosed, illustrated and shown with such other embodiments or modifications being intended to be reserved especially as they fall within the scope of the claims here appended.*

What is claimed as new is as follows:

1. A control system for [dump body] load carrying vehicles having *a dump body thereon,* a spreader mounted on the rear [thereof] *of the vehicle* and a snow plow mounted on the forward end thereof, hydraulic means interconnecting the snow plow and *the* vehicle for varying the position of the snow plow, hydraulic means interconnecting the dump body and the vehicle for raising and lowering the dump body, and [a] hydraulic [motor] *means* for operating said spreader, said control system comprising a single hydraulic pump *having a variable discharge* mounted under [the] *a* hood of the vehicle and [and having a variable output], a reservoir communicated with the pump and being located under the *vehicle* hood for ease of access when refilling the [hydraulic] *control* system, a control valve communicating the fluid pressure discharge of the pump with the hydraulic means interconnecting the vehicle and the snow plow, a control valve communicating the pump discharge with the hydraulic means interconnecting the vehicle and *the* dump body, and a control valve communicating the discharge of the pump with the hydraulic [motor] *means* of the spreader, all of said control valves being located within [the] *a* cab of the vehicle for access by [the] *an* operator, each of said control valves being provided with a pressure control line bypassing pressurized fluid back to the pump, *and* [said] variable [output] *discharge* means *for* varying the [output] *discharge of the pump* in response to the quantity of bypassed pressurized fluid back to the pump thereby providing for variation in the [output] *discharge* of the pump in response to demand of the [fluid motors] *hydraulic means* operated thereby.

2. The combination as defined in claim 1 wherein said pump is provided with a solenoid controlling the discharge thereof, and a switch connecting the pump solenoid to a battery for controlling the [output] *discharge* of the pump, said switch being disposed within the cab of the vehicle for control by the operator of the vehicle.

3. The combination as defined in claim 1 wherein said spreader [motor] control valve is provided with an adjustable orifice control for controlling the speed of the spreader.

4. The structure as defined in claim 1 wherein the dump body is also provided with a hydraulically reciprocated feeder for forcing [the] material rearwardly in the dump body, said feeder being communicated with the discharge of the pump and controlled by needle valves and a feeder switch valve for automatically operating the feeder at an adjustable rate when the spreader becomes empty.

5. The combination as defined in claim 4 together with a [buzzer] signal located in the cab of the vehicle for indicating to the operator of the vehicle that the load carrying *dump* body and the spreader are empty.

6. The combination of claim 5 wherein a switch is provided for the [buzzer] *signal* and spreader after emptying whereby the operator of the vehicle may return for another load without continuous operation of the [buzzer] *signal.*

7. A control assembly for *a* dump [bodies] *body* mounted on *a* vehicle[s] with the dump body having a spreader mounted on the rear thereof and the vehicle having a snow plow mounted on the forward end thereof, hydraulic pressure supply means mounted on the vehicle, hydraulic conduit means interconnecting the hydraulic *pressure* supply means and the snow plow on the vehicle, hydraulic conduit means interconnecting the hydraulic *pressure* supply means and the spreader for powering the spreader, a directional control valve in the hydraulic conduit *means* interconnecting the *hydraulic pressure* supply means and *the* snow plow, an orifice control valve in the hydraulic conduit means interconnecting the *hydraulic pressure* supply means and the spreader, a pressure control line interconnecting the *hydraulic* conduit means remote from the control valve and the *hydraulic pressure* supply means, said *hydraulic pressure* supply means [including] *comprising* means responsive to flow of fluid through the pressure control line for varying the output of the *hydraulic pressure* supply means in response to the demand of the snow plow and *the* spreader.

[8. In a hydraulic control system for a load carrying vehicle having a hydraulically powered spreader at one end thereof, a variable output pump, a pressure supply line interconnecting the pump and the spreader motor, a control valve in the pressure line, and a pressure control valve interconnecting the pump and the pressure line at a point remote from the control valve, said pump including means varying the output thereof in response to the volume of flow of fluid through the pressure control valve thereby providing a pressure supply adequate to satisfy the demand of the hydraulically operated spreader.]

*9. Apparatus for positioning, powering, driving controlling or in some way actuating a hydraulically operable unit, comprising, in combination,*

*hydraulic means for positioning, powering, driving, controlling or in some way actuating such unit,*

*a normal minimum flow variable displacement hydraulic pump device having control structure for varying the displacement thereof,*

*fluid pressure supply conduit means for placing the fluid pressure discharge of the pump device in communication with the hydraulic means,*

*valving for selectively controlling the fluid pressure discharge of the pump device through the fluid pressure supply conduit means, and*

*control conduit means for transmitting the developed fluid pressure of the discharge fluid pressure supply conduit means directly back to the pump control structure by placing the fluid pressure supply conduit means in direct communication with the pump control structure,*

*said control conduit means extending directly between the pump control structure and the fluid pressure supply conduit means at a location therealong which is intermediate the valving and the hydraulic means to enable the fluid pressure which has been transmitted ot the pump control structure through the control conduit means to be effective in varying the fluid pressure discharge of the pump device in direct response to the demand which has been placed thereon by the hydraulic means which is being operated thereby.*

*10. Apparatus for operating hydraulic means, said apparatus comprising.*

*a normal minimum flow variable displacement hydraulic pump device having control structure for varying the displacement thereof,*

*fluid pressure supply conduit means for placing the fluid pressure discharge of the pump device in communication with the hydraulic means,*

*valving for selectively controlling the fluid pressure discharge of the pump device through the fluid pressure supply conduit means, and*

*control conduit means for transmitting the developed fluid pressure of the discharged fluid in the fluid pressure supply conduit means directly back to the pump control structure by placing the fluid pressure supply conduit means in direct communication with the pump control structure,*

*said control conduit means extending directly between the pump control structure and the fluid pressure supply conduit means at a location therealong which is downstream from the valving to enable the fluid pressure which is transmitted through the control conduit means to the pump control structure to be effective in varying the fluid pressure discharge of the pump device in direct response to the demand which has been placed thereon by the hydraulic means which is being operated thereby.*

*11. Apparatus for operating a plurality of units which may be associated with a vehicle, said apparatus comprising, in combination,*

*hydraulic means for operating each of such units,*

*a normal minimum flow variable displacement hydraulic pump device having control structure for varying the displacement thereof,*

*fluid pressure supply conduit means for placing the fluid pressure discharge of the pump device in communication with each of the hydraulic means,*

*valving for selectively controlling the fluid pressure discharge of the pump device through each of the fluid pressure supply conduit means, and*

*control conduit means for transmitting the developed fluid pressure of the discharged fluid in each of the fluid pressure supply conduit means directly back to the pump control structure by placing each of the fluid pressure supply conduit means in direct communication with the pump control structure,*

*each of said control conduit means extending directly between the pump control structure and the respective fluid pressure supply conduit means at a location therealong which is downstream from the valving which is associated therewith to enable the fluid pressure which is transmitted through each of the control conduit means to the pump control structure to be effective in varying the fluid pressure discharge of the pump device in direct response to the demand which has been placed thereon by the respective hydraulic means which is being operated thereby.*

*12. In combination with a hydraulically operable unit having hydraulic means, apparatus for enabling the hydraulic means to operate the unit,*

*a normal minimum flow variable displacement hydraulic pump device having control structure for varying the displacement thereof,*

*fluid pressure supply conduit means for placing the fluid pressure discharge of the pump device in communication with the hydraulic means of the unit,*

*valving for selectively controlling the fluid pressure discharge of the pump device through the fluid pressure supply conduit means, and*

*control conduit means for transmitting the developed fluid pressure of the discharged fluid in the fluid pressure supply conduit means directly back to the pump control structure by placing the fluid pressure supply conduit means in direct communication with the pump control structure,*

*said control conduit means extending directly between the pump control structure and the fluid pressure supply conduit means at a location therealong which is intermediate the valving and the hydraulic means of the unit to enable the fluid pressure which has been transmitted to the pump control structure through the control conduit means to be effective in varying the fluid pressure discharge of the pump device in direct response to the demand which has been placed thereon by the hydraulic means of the unit which is being operated thereby.*

*13. In combination with a vehicle having a unit thereon which is operable in response to hydraulic means, apparatus for operating the hydraulic means, said apparatus comprising,*

*a normal minimum flow variable displacement hydraulic pump device having control structure for varying the displacement thereof,*

*fluid pressure supply conduit means for placing the fluid pressure discharge of the pump device in communication with the hydraulic means,*

*valving for selectively controlling the fluid pressure discharge of the pump device through the fluid pressure supply conduit means, and*

*control conduit means for transmitting the developed fluid pressure of the discharged fluid in the fluid pressure supply conduit means directly back to the pump control structure by placing the fluid pressure supply conduit means in direct communication with the pump control structure,*

*said control conduit means extending directly between the pump control structure and the fluid pressure supply conduit means at a location therealong which is downstream from the valving to enable the fluid pressure which is transmitted through the control conduit means to the pump control structure to be effective in varying the fluid pressure discharge of the pump device in direct response to the demand which has been placed thereon by the hydraulic means which is being operated thereby.*

*14. A hydraulic control system for operating hydraulic means, said system comprising in combination,*

*a normal minimum flow variable displacement hydraulic pump device having control structure for varying the displacement thereof,*

*fluid pressure supply conduit means for placing the fluid pressure discharge of the pump device in communication with the hydraulic means,*

*valving for selectively controlling the fluid pressure discharge of the pump device through the fluid pressure supply conduit means, and*

*control conduit means for transmitting the developed fluid pressure of the discharged fluid in the fluid pressure supply conduit means directly back to the pump control structure by placing the fluid pressure supply conduit means in direct communication with the pump control structure,*

*said control conduit means extending directly between the pump control structure and the fluid pressure supply conduit means at a location therealong which is intermediate the valving and the hydraulic means to enable the fluid pressure which has been transmitted to the pump control structure through the control conduit means to be effective in varying the fluid pressure discharge of the pump device in direct response to the demand which has been placed thereon by the hydraulic means which is being operated thereby.*

*15. A hydraulic control system for operating a hydraulically operable unit which may be associated with a vehicle, said system comprising, in combination,*

*a normal minimum flow variable displacement hydraulic pump device having control structure for varying the displacement thereof,*

*fluid pressure supply conduit means for placing the fluid pressure discharge of the pump device in communication with the hydraulic means,*

*valving for selectively controlling the fluid pressure discharge of the pump device through the fluid pressure supply conduit means, and*

*control conduit means for transmitting the developed fluid pressure of the discharged fluid in the fluid pressure supply conduit means directly back to the pump control structure by placing the fluid pressure supply conduit means in direct communication with the pump control structure,*

*said control conduit means extending directly between the pump control structure and the fluid pressure supply conduit means at a location therealong which is downstream from the valving to enable the fluid pressure which is transmitted through the control conduit means to the pump control structure to be effective in varying the fluid pressure discharge of the pump device in direct response to the demand which has been placed thereon by the hydraulic means which is being operated thereby.*

*16. A hydraulic control system for operating a plurality of units which may be associated with a vehicle, said system comprising, in combination,*

*hydraulic means for operating each of said units,*

*a single normal minimum flow variable displacement hydraulic pump device having control structure for varying the displacement thereof,*

*fluid pressure supply conduit means for placing the fluid pressure discharge of the pump device in communication with each of the hydraulic means,*

*valving for selectively controlling the fluid pressure discharge of the pump device through each of the fluid pressure supply conduit means, and*

*control conduit means for transmitting the developed fluid pressure of the discharge fluid in each of the fluid pressure supply conduit means directly back to the pump control structure by placing each of the fluid pressure supply conduit means in direct communication with the pump control structure,*

*each of said control conduit means extending directly between the pump control structure and the respective fluid pressure supply conduit means at a location therealong which is downstream from the valving which is associated therewith to enable the fluid pressure which is transmitted through each of the control conduit means to the pump control structure to be effective in varying the fluid pressure discharge of the pump device in direct response to the demand which has been placed thereon by the respective hydraulic means which is being operated thereby.*

References Cited by the Examiner

The following references, cited by the Examiner, are of record in the patented file of this patent or the original patent.

UNITED STATES PATENTS

| | | | |
|---|---|---|---|
| 2,472,477 | 6/49 | Harrington et al. | 60—52 |
| 2,599,840 | 6/52 | Keele et al. | 200—61.21 |
| 2,697,609 | 12/54 | Chase et al. | 275—8 |
| 2,700,397 | 1/55 | Compton | 137—569 |
| 2,738,196 | 3/56 | Underwood | 275—8 |
| 2,799,510 | 7/57 | Schmidt | 37—41 X |
| 2,867,091 | 1/59 | Orloff et al. | 60—52 X |
| 2,892,311 | 6/59 | Van Gerpen | 60—52 |
| 2,892,312 | 6/59 | Allen et al. | 60—52 |
| 2,921,439 | 1/60 | Krafft et al. | 60—52 |
| 2,984,985 | 5/61 | MacMillin | 60—97 |

JULIUS E. WEST, *Primary Examiner.*

EDGAR W. GEOGHEGAN, *Examiner.*